(12) United States Patent
Hoopes et al.

(10) Patent No.: US 7,654,552 B2
(45) Date of Patent: Feb. 2, 2010

(54) SINGLE JAW MECHANISM FOR FIFTH WHEEL HITCH

(75) Inventors: Michael A. Hoopes, White Pigeon, MI (US); Richard W. McCoy, Granger, IN (US); Thomas W. Lindenman, South Bend, IN (US); Anthony S. Roberts, Granger, IN (US)

(73) Assignee: Cequent Towing Products, Inc., Plymouth, MI (US)

( * ) Notice: Subject to any disclaimer, the term of this patent is extended or adjusted under 35 U.S.C. 154(b) by 95 days.

(21) Appl. No.: 10/554,114

(22) PCT Filed: Apr. 20, 2004

(86) PCT No.: PCT/US2004/012060

§ 371 (c)(1),
(2), (4) Date: Sep. 28, 2006

(87) PCT Pub. No.: WO2004/094213

PCT Pub. Date: Nov. 4, 2004

(65) Prior Publication Data

US 2007/0102897 A1    May 10, 2007

Related U.S. Application Data

(60) Provisional application No. 60/464,287, filed on Apr. 21, 2003.

(51) Int. Cl.
*B62D 53/06* (2006.01)

(52) U.S. Cl. .................................................... 280/433
(58) Field of Classification Search ......... 280/433–437, 280/441.2
See application file for complete search history.

(56) References Cited

U.S. PATENT DOCUMENTS

| | | | |
|---|---|---|---|
| 3,251,609 A | 5/1966 | Daniels | |
| 4,566,715 A * | 1/1986 | Buckley | 280/434 |
| 4,826,199 A | 5/1989 | Chambers | |
| 5,529,329 A | 6/1996 | McCoy | |
| 6,109,642 A * | 8/2000 | Schuettenberg | 280/433 |
| 6,398,249 B1 * | 6/2002 | Lindenman et al. | 280/434 |
| 7,264,259 B2 * | 9/2007 | Lindenman et al. | 280/438.1 |

OTHER PUBLICATIONS

Int'l Search Report, Jul. 28, 2005.
Int'l Search Report, Mar. 4, 2005, Cequent Towing Products.
Int'l Written Opinion, Mar. 4, 2005, Cequent Towing Products.

* cited by examiner

*Primary Examiner*—Tony H. Winner
(74) *Attorney, Agent, or Firm*—McDonald Hopkins LLC

(57) ABSTRACT

A jaw for a fifth wheel hitch assembly includes a jaw body having a stepped bearing surface. A jaw assembly for a fifth wheel hitch assembly includes a jaw body, a control handle and a connecting link where the connecting link is pivotally connected to the control handle on the jaw body. A fifth wheel hitch assembly includes a base assembly for mounting to a towing vehicle, a head assembly carried on the base assembly and a jaw assembly carried on the head assembly. That jaw assembly includes a jaw body having a stepped bearing surface for engaging a king pin of a trailer.

14 Claims, 12 Drawing Sheets

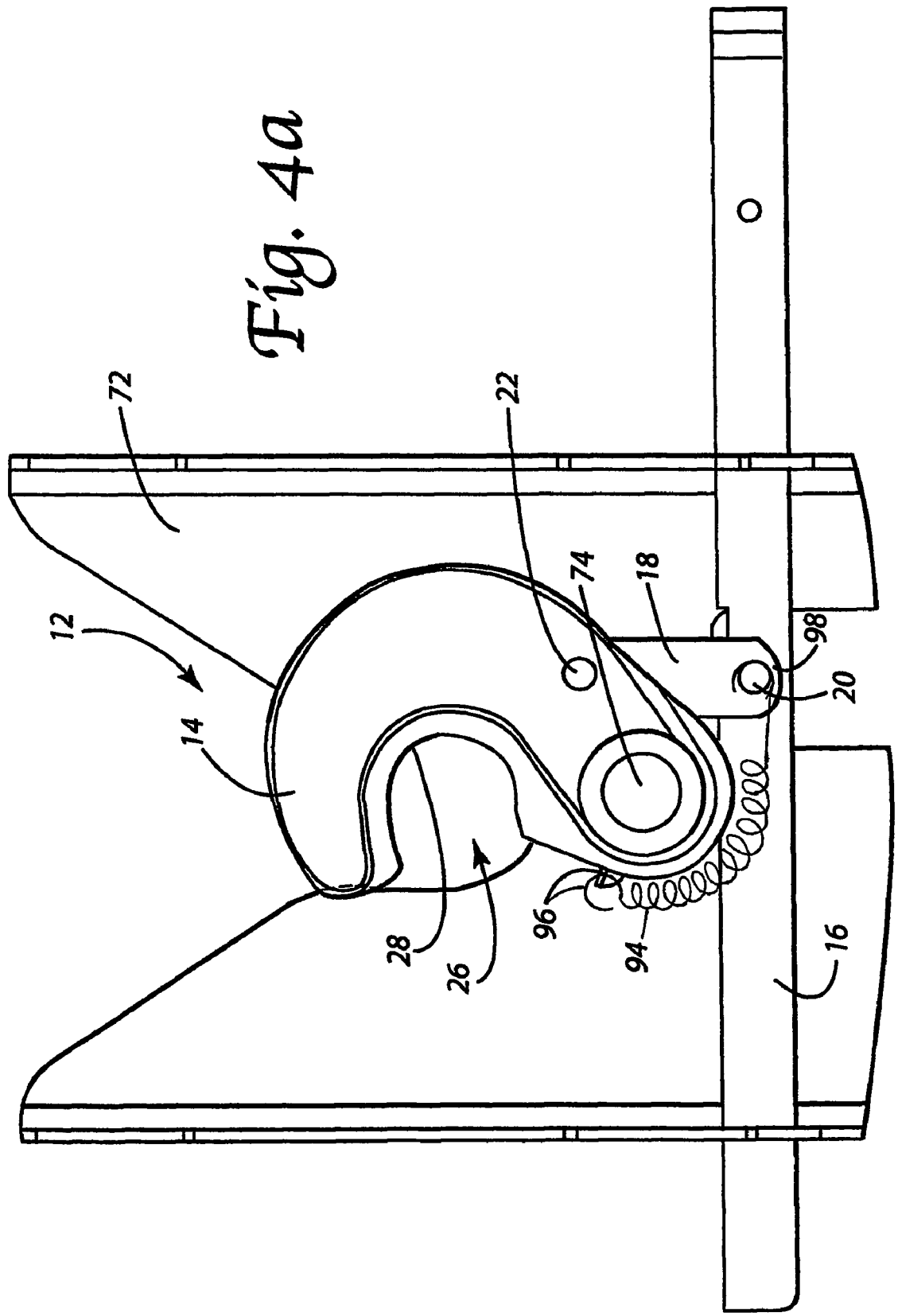

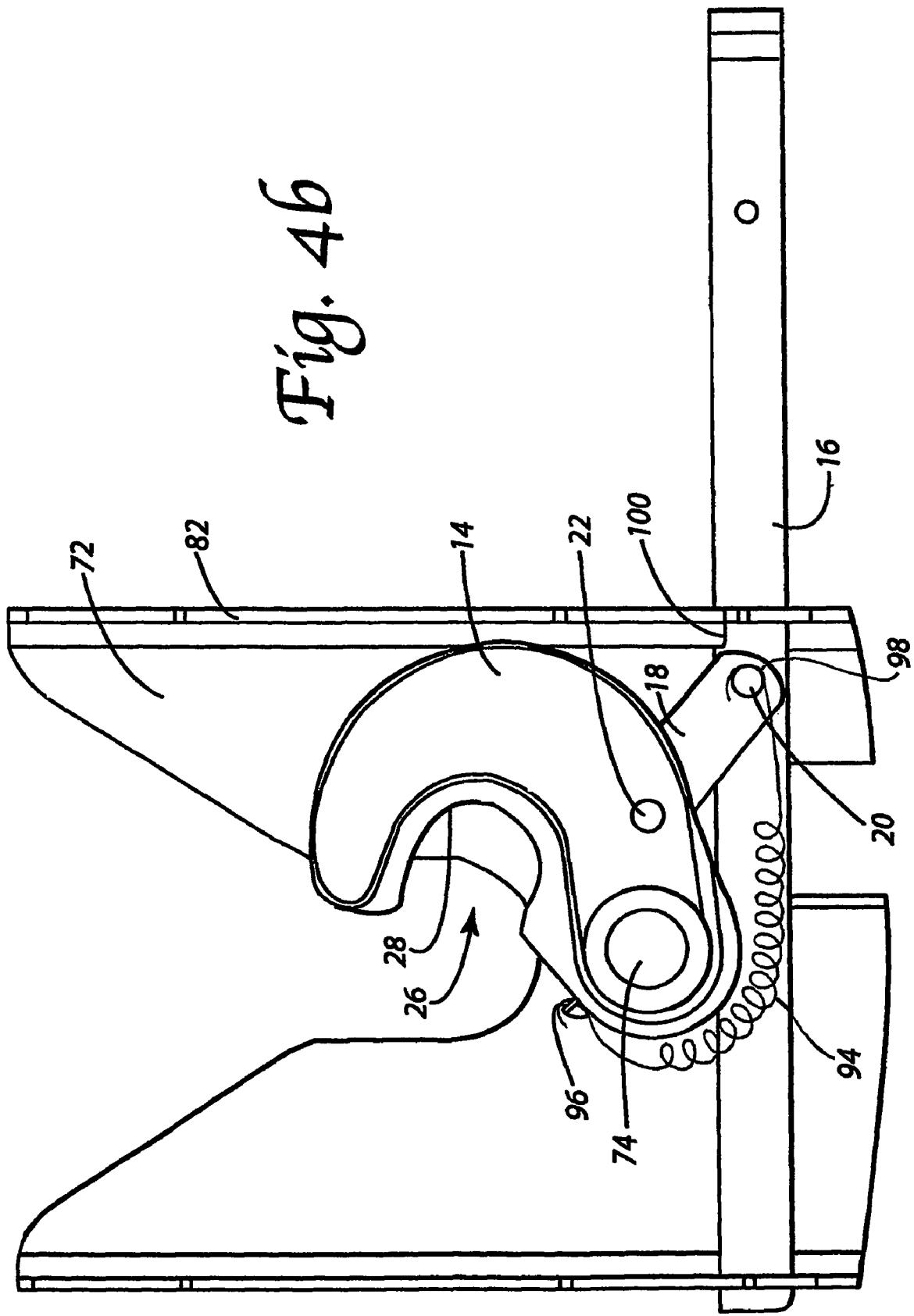

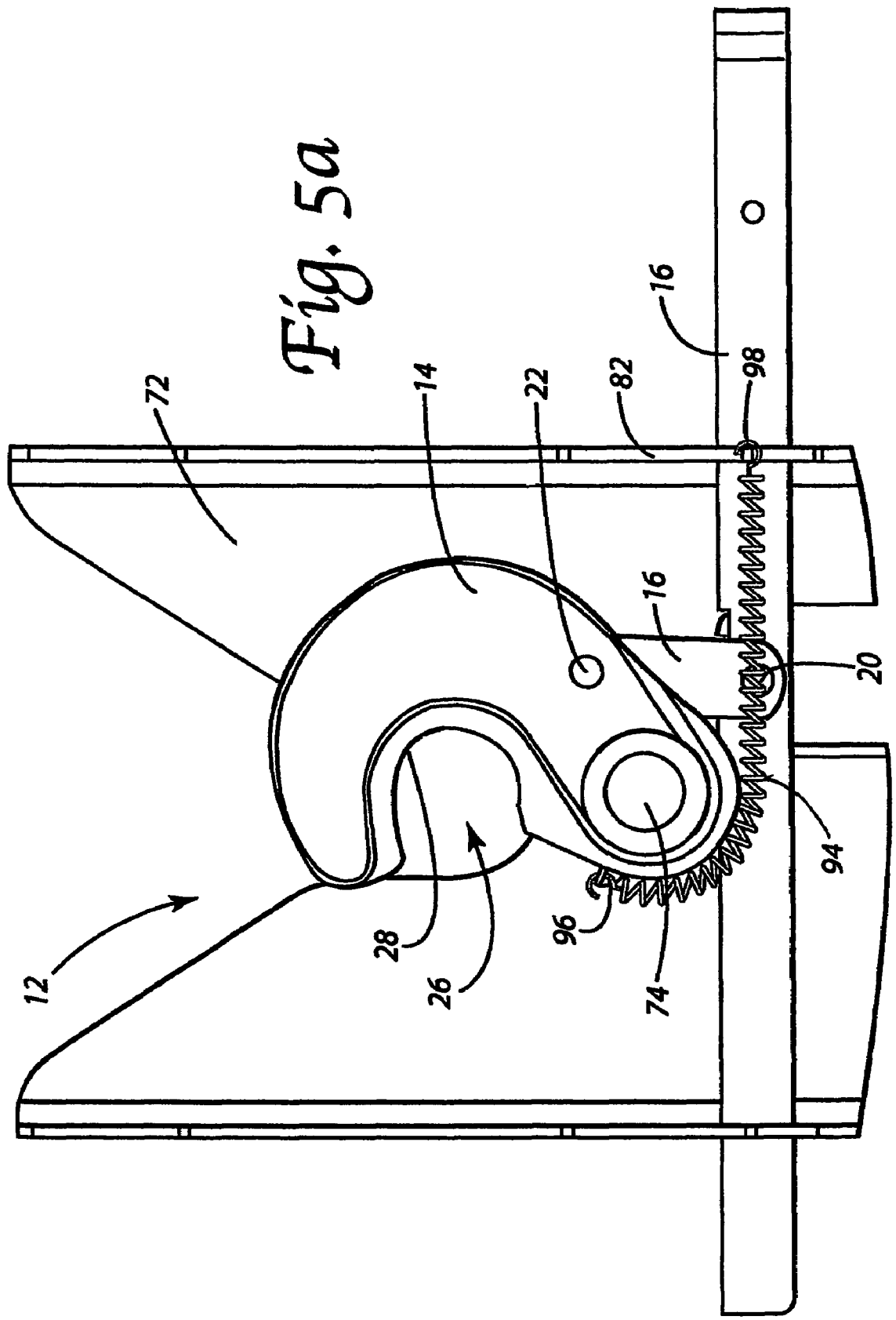

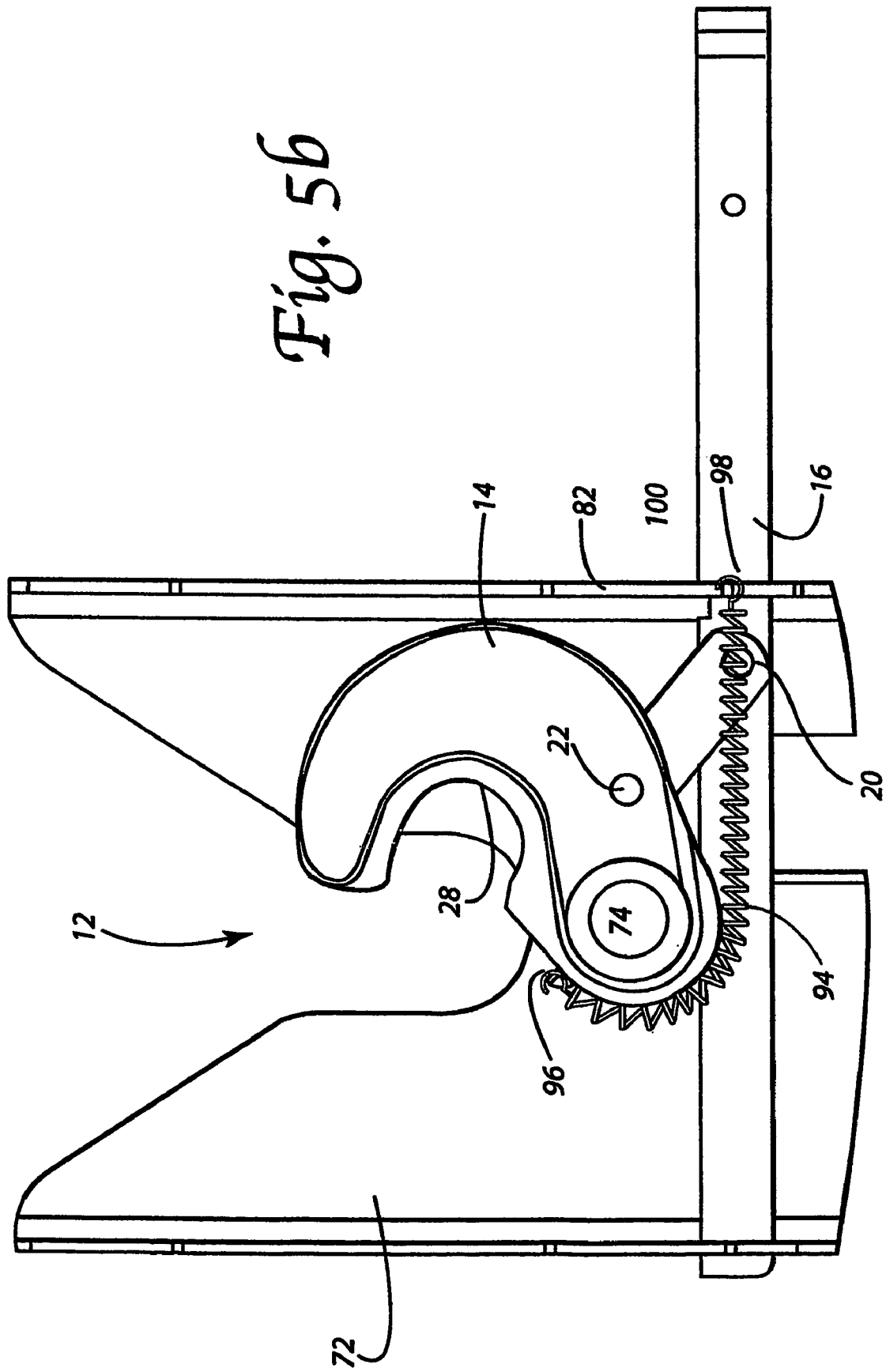

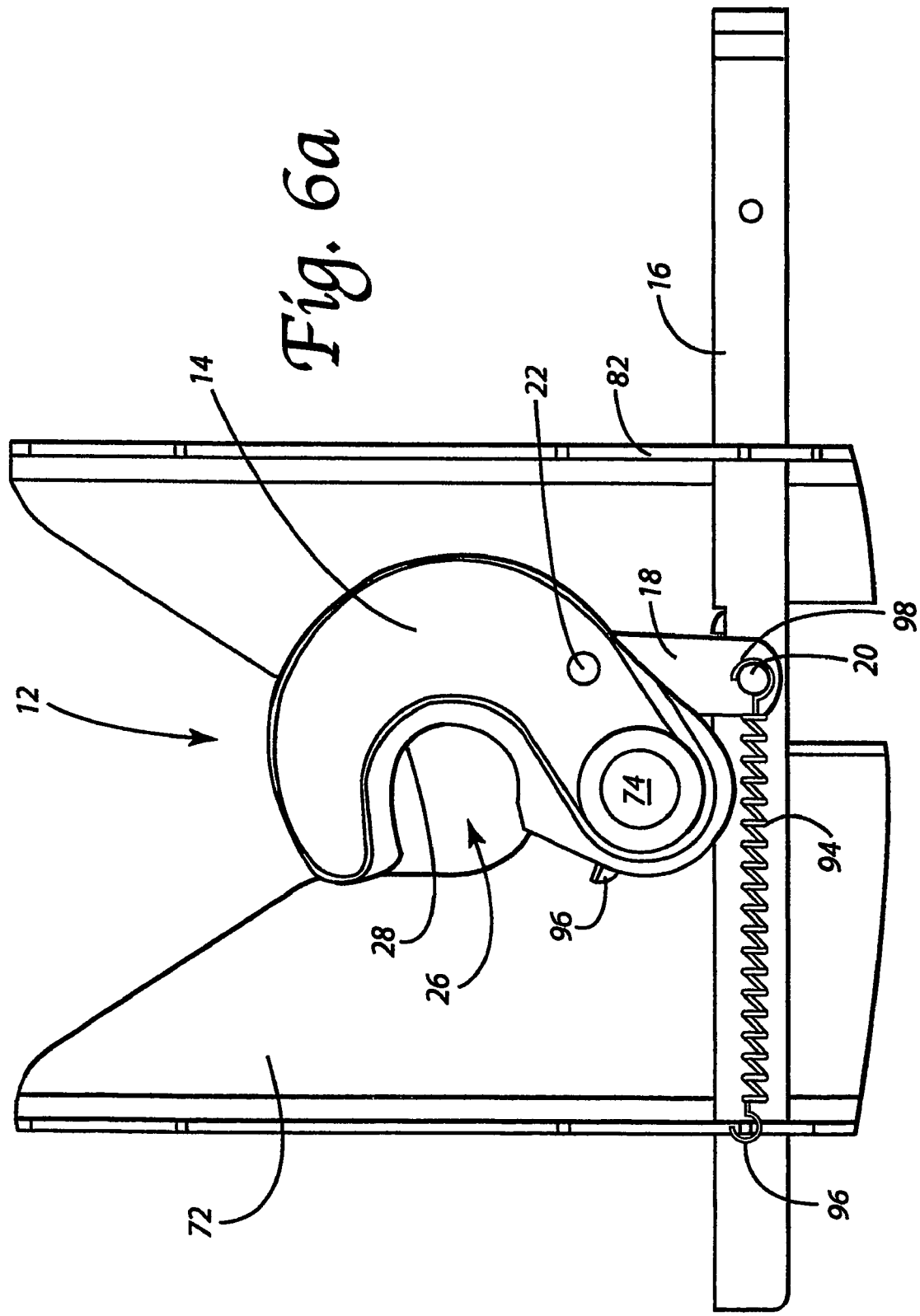

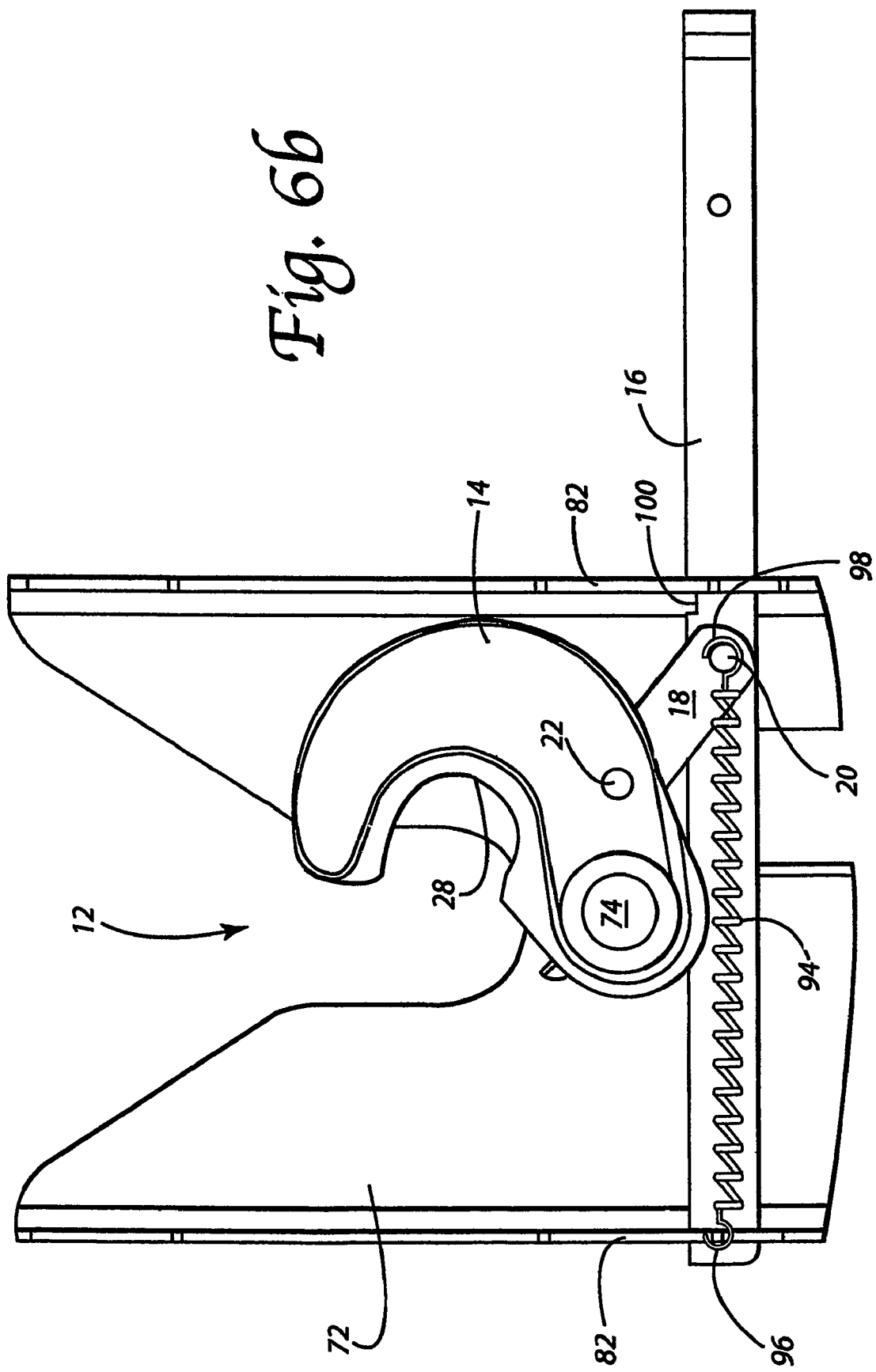

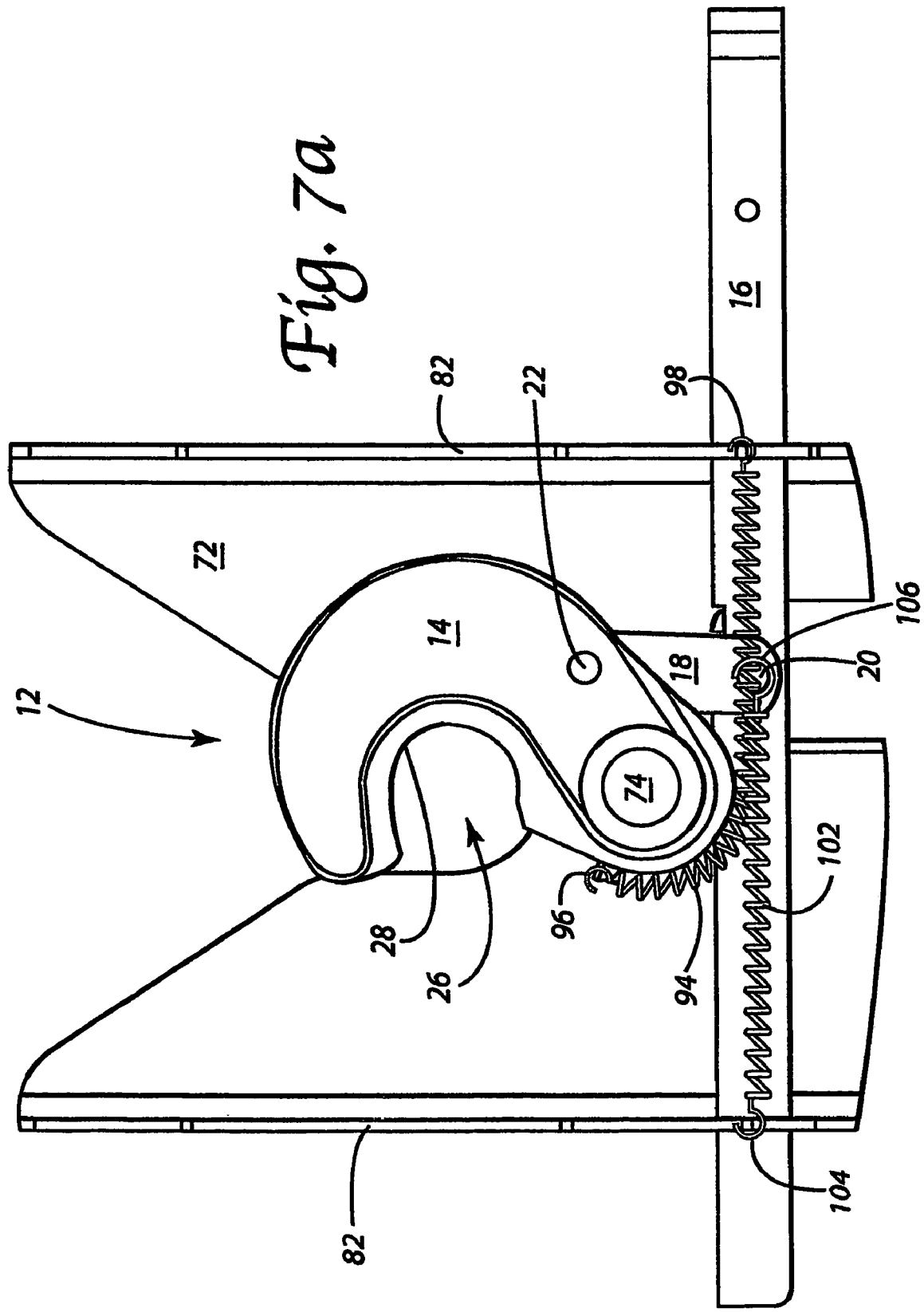

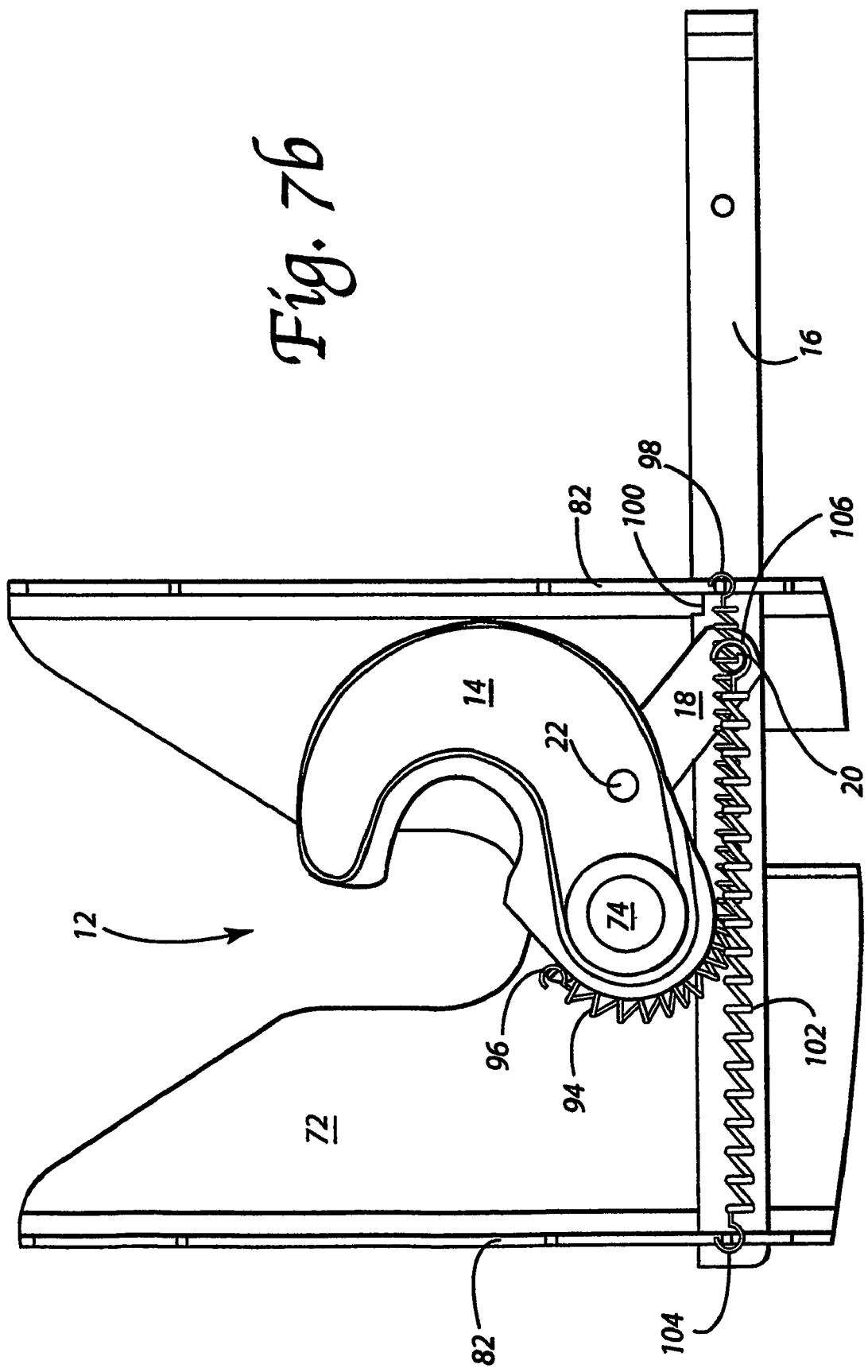

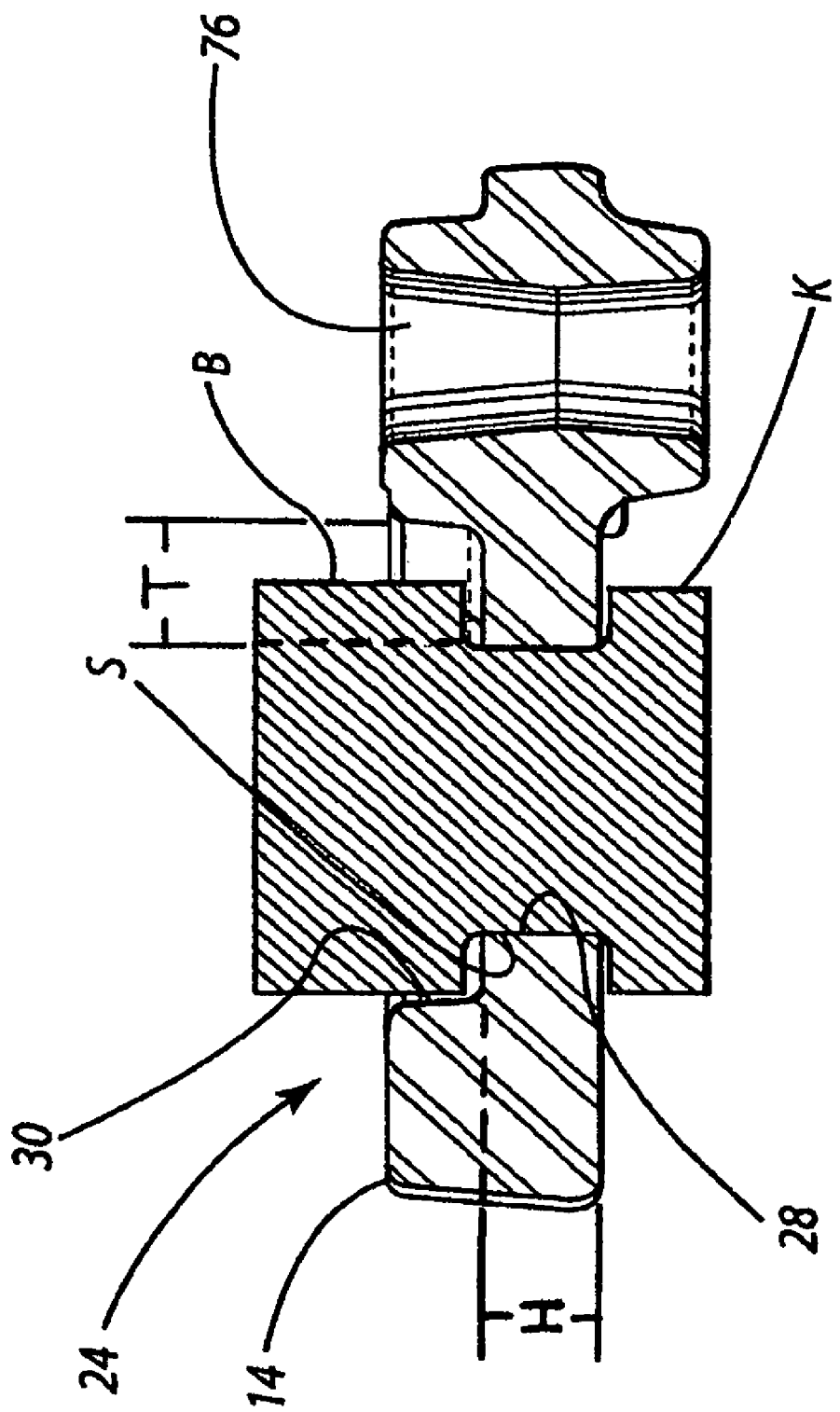

SINGLE JAW MECHANISM FOR FIFTH WHEEL HITCH

This is a U.S. National Stage Application of International Patent Application Ser. No. PCT/US04/012060 filed Apr. 20, 2004, which claims priority to U.S. Provisional Patent Application Ser. No. 60/464,287 filed on Apr. 21, 2003.

TECHNICAL FIELD

The present invention relates generally to the trailer towing field, and more particularly, to an improved jaw, jaw assembly and fifth wheel hitch assembly incorporating that jaw assembly.

BACKGROUND OF THE INVENTION

Fifth wheel hitches are well known to those in the trailer towing field. Various models of fifth wheel hitches have been manufactured and sold by Cequent Towing Products, Inc. and its predecessor Reese Products, Inc. The fifth wheel hitches generally include a base which is held in the bed and mounted to the frame of a pick up truck. The base supports a head assembly including a skid plate and a locking jaw mechanism for securing the king pin of the trailer being towed in proper position with the weight of the trailer properly supported on the skid plate. An example of a fifth wheel hitch incorporating such a structural arrangement is found in U.S. Pat. No. 4,721,323 to Czuk et al.

While the jaw assembly mechanism described in the Czuk et al. patent functions beautifully for its intended purpose, it should be appreciated that it is a relatively complicated structure incorporating coupling plates or links with a radially extending slot and cooperating pivot pin providing interconnection between the two jaws of the assembly. This arrangement incorporates a relatively large number of parts, which disadvantageously increase manufacturing costs. A need is therefore identified for a new, simpler jaw assembly that is less expensive to produce yet still provides reliable operation over a long service life.

SUMMARY OF THE INVENTION

In accordance with the purposes of the present invention as described herein, a new and improved jaw is provided for a fifth wheel hitch assembly. The jaw comprises a jaw body including a stepped bearing surface.

More specifically, the stepped bearing surface includes a first step having a height of about 0.56 to about 0.81 inches and a tread of about 0.375 to about 0.625 inches and a second step having a height of about 0.43 to about 0.69 inches. Typically the stepped bearing surface of the jaw body includes a first step having a height of about 0.69 inches and a tread of about 0.5 inches and a second step having a height of about 0.56 inches.

In accordance with another aspect of the present invention, a new and improved jaw assembly is provided. The jaw assembly comprises a jaw body, a control handle and a connecting link where that connecting link is pivotally connected to the control handle and the jaw body. The jaw body is displaceable between an open position and a closed position and the connecting link passes over center when the jaw body is displaced between those two positions.

The jaw body includes the stepped bearing surface. The stepped bearing surface includes a first step having a height of about 0.56 to about 0.81 inches and a tread of about 0.375 to about 0.625 inches and a second step having a height of about 0.43 to about 0.69 inches.

In accordance with yet another aspect of the present invention, a fifth wheel hitch assembly is provided. The fifth wheel hitch assembly comprises a base assembly for mounting to a towing vehicle, a head assembly carried on the base assembly and a jaw assembly carried on the head assembly. That jaw assembly includes a jaw body having a stepped bearing surface for engaging a king pin of a trailer.

More particularly describing the invention, the jaw assembly includes a control handle and a connecting link. The connecting link is pivotally connected to the control handle by a first pivot pin and to the jaw body by a second pivot pin. Further, the head assembly includes a skid plate and a mounting platform. The jaw body is pivotally mounted on the mounting platform by means of a third pivot pin.

The jaw assembly further includes a first spring having a first end connected to the jaw body. The second end of the first spring maybe connected to the first pivot pin, the head assembly or the mounting platform. In an alternative embodiment the jaw assembly may include a second spring. That second spring may be connected between the first pivot pin and the head assembly.

The head assembly includes at least two slots for receiving the control handle. The slots are dimensioned to allowed the control handle to slide freely through the slots. Further the control handle includes a notch that may be brought into engagement with the head assembly by shifting the control handle transversely in the two slots. Still further describing the invention, the jaw body is displaceable between an open position and a closed position. The connecting link passes over center when the jaw is displaced between the open and closed positions.

More particularly describing the invention the stepped bearing surface of the jaw body includes a first step having a height of about 0.56 to about 0.81 inches and a tread of about 0.375 to about 0.625 inches and a second step having a height of about 0.43 to about 0.69 inches. Thus, a typical stepped bearing surface may include a first step having a height of about 0.69 inches and a tread of about 0.5 inches and a second step having a height of about 0.56 inches.

In accordance with yet another aspect of the present invention, a fifth wheel hitch assembly comprises a base assembly for mounting to a towing vehicle, a head assembly carried on the base assembly and a jaw assembly carried on the head assembly. That jaw assembly includes a jaw body, a control handle and a connecting link. That connecting link is pivotally connected to the control handle by a first pivot pin and to the jaw body by a second pivot pin.

Still other features and advantages of the present invention will become readily apparent to those skilled in this art from the following description wherein there is shown and described several preferred embodiments of this invention simply by way of illustration of some of the modes best suited to carry out the invention. As it will realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain certain principles of the invention. In the drawings:

FIGS. 4a and 4b are top plan views illustrating a first spring arrangement and showing the jaw, respectively, in closed and open positions;

FIGS. 5a and 5b are top plan views illustrating a second spring arrangement and showing the jaw, respectively, in closed and open positions;

FIGS. 6a and 6b are top plan views illustrating a third spring arrangement and showing the jaw, respectively, in closed and open positions;

FIGS. 7a and 7b are top plan views illustrating a fourth spring arrangement and showing the jaw, respectively, in closed and open positions; and FIG. 8 is a cross sectional view through the jaw body clearly illustrating the stepped bearing surface and how that surface engages a trailer king pin.

Reference will now be made in detail to the present preferred embodiment of the invention, an example of which is illustrated in the accompanying drawings.

DETAILED DESCRIPTION OF THE INVENTION

Figure 3:
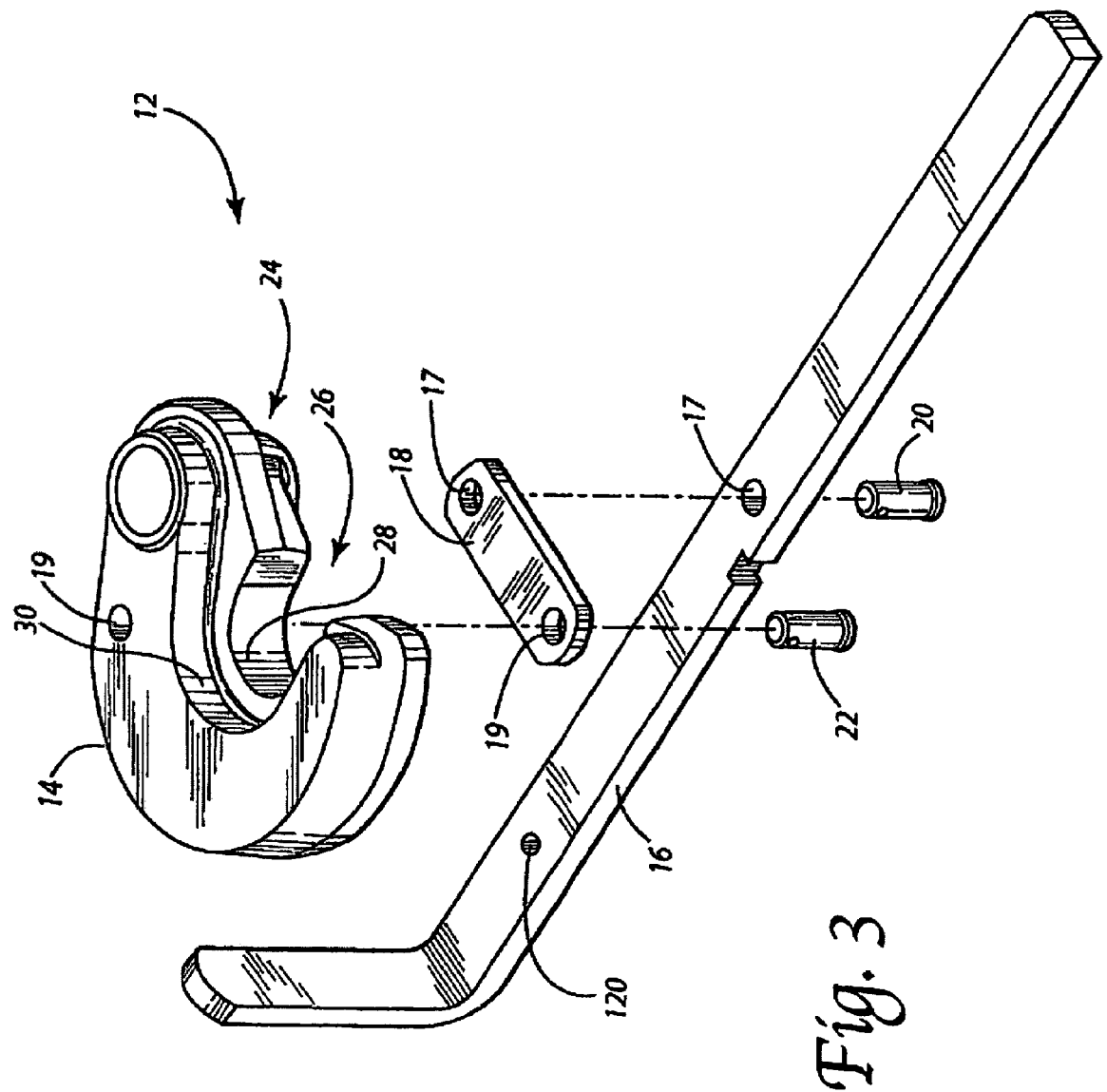
FIG. 3 is an exploded perspective view of the jaw body, control handle, connecting link and pivot pins for connecting those components together.

Reference is now made to the drawing figures illustrating the fifth wheel hitch assembly 10 of the present invention incorporating the new and improved locking jaw assembly 12. As best illustrated in FIG. 3, the jaw assembly 12 includes a jaw body 14, a control handle 16 and a connecting link 18. A first pivot pin 20 connects the connecting link 18 to the control handle 16 by engagement in the apertures 17. A second pivot pin 22 connects the connecting link 18 to the jaw body 14 by engagement in the apertures 19.

As further illustrated in FIGS. 3 and 8, the jaw body 14 includes a stepped bearing surface 24. The stepped bearing surface 24 is arcuate and is substantially hook shaped so as to form a king pin receiving slot 26. As best shown with reference to FIG. 8, the stepped bearing surface 24 includes a first step 28 and a second step 30. The two steps 28, 30 are sized and shaped to provide a larger surface area in engagement with a trailer king pin K when the jaw assembly 12 is closed or latched to secure a trailer to the towing vehicle to which the trailer hitch assembly 10 is mounted. More specifically, the step 28 extends into the groove of the king pin K to engage the stem S while the step 30 is in position to engage base B of the king pin K. Advantageously, this two-point engagement between the bearing surface 24 and both the stem S and base B of the king pin K spreads the load over a larger surface area thereby reducing strain on the jaw body 14. The first step 28 may have a height $H^1$ of about 0.56 to about 0.81 inches and a tread T of about 0.375 to about 0.625 inches. The second step may have a height $H^2$ of about 0.43 to about 0.69 inches. Accordingly, a typical stepped bearing surface 24 will have a first step 28 having a height $H^1$ of about 0.69 inches and a tread T of about 0.5 inches and a second step 30 having a height $H^2$ of about 0.56 inches.

Figure 1:
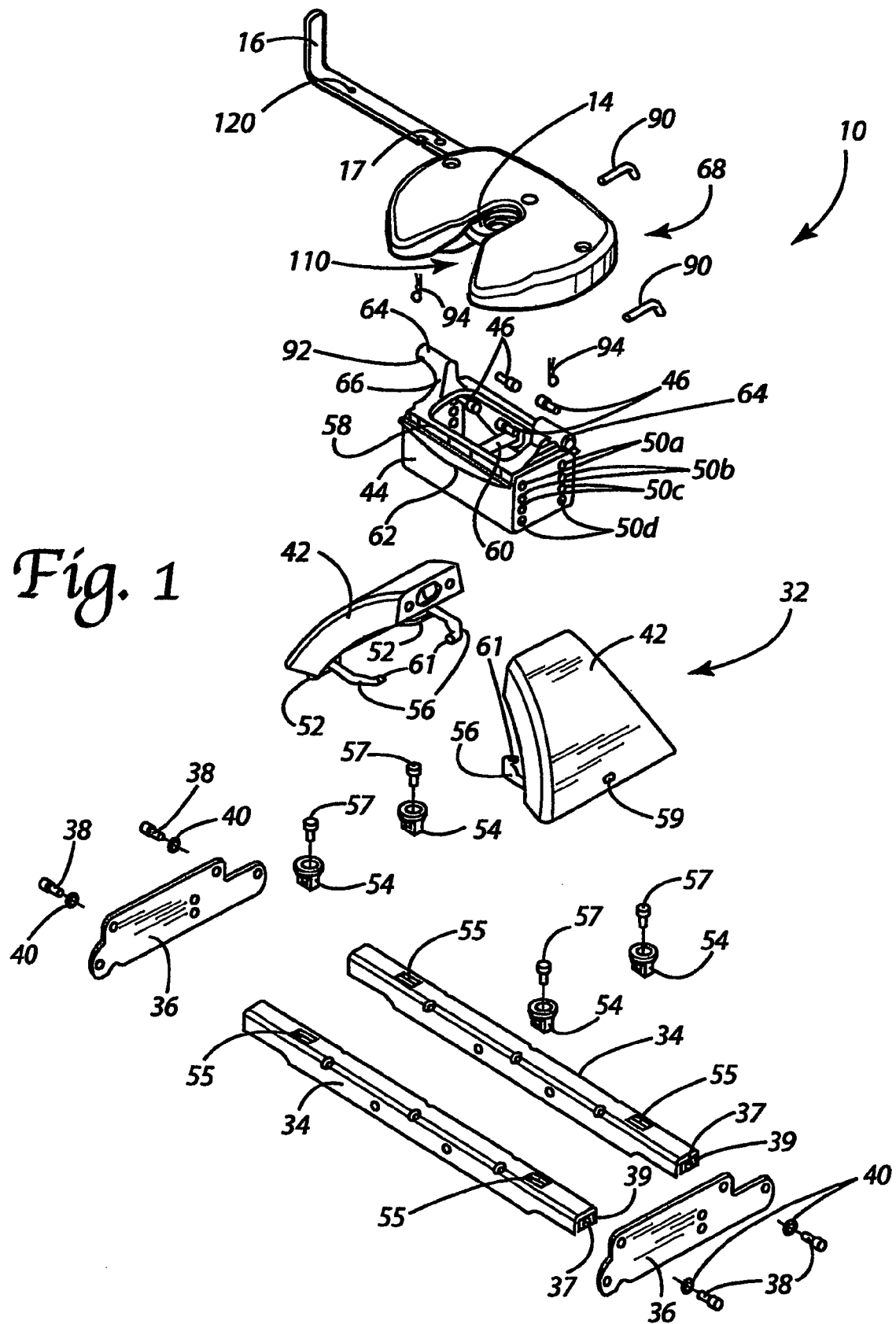
FIG. 1 is an exploded perspective view of the fifth wheel hitch assembly of the present invention.

As previously noted, the jaw assembly 12 is particularly suited for mounting in a fifth wheel hitch assembly 10 of the type illustrated in FIG. 1. It should be appreciated, however, that the description of the fifth wheel hitch assembly 10 should only be considered as being illustrative in nature and that the jaw assembly 12 is not limited to application into this specific fifth wheel hitch assembly design.

The fifth wheel hitch assembly 10 illustrated in FIG. 1 includes a base assembly, generally designated by reference numeral 32. The base assembly 32 comprises a pair of cross members 34 connected together by a pair of end plates 36 by means of bolts 38 and lock washers 40. More specifically, the bolts 38 are tightened into threaded apertures 37 in the mounting plates 39. Of course, while bolts 38 and lock washers 40 are shown, other types of fasteners (e.g. screws) or fastening processes (e.g. welding) could be utilized. The base assembly 32 may be secured through the end plates 36 to the frame of a vehicle so that the cross members 34 lie immediately below the bed of that vehicle. Any appropriate fasteners or fastening processes known in the art to be useful for this purpose may be utilized.

As further illustrated in FIG. 1, the base assembly 32 also includes a mounting platform comprising two leg sections 42 and a central or cradle section 44 extending between and bolted to the two leg sections by bolts 46 and cooperating lock washers (not shown). The height of the cradle section 44 may be adjusted relative to the legs 42 by extending the bolts 46 through the different aperture sets 50a-50d provided at each side or end of the cradle section.

Each leg 42 includes a pair of mounting feet 52. Each cross member 34 includes a pair of feet receiving sockets 54 mounted in apertures 55 in the cross members by bolts 57. The sockets 54 extend through holes cut in the bed of the vehicle so as to be accessible from above. A control handle 56 is connected to each foot 52 of each leg 42. When the feet 52 are fully seated in the sockets 54, the control handles 56 are rotated so that the ends of the handles extend through the apertures 59 in the legs 42 thereby locking the feet in the sockets. A pin (not shown) is then inserted through the aligned holes 61 in the handles to secure the handles in position and securely lock the feet 52 in the sockets 54. In this way, the mounting platform 42, 44 is securely held and locked in position in the bed of the towing vehicle.

A rocker 58 is pivotally mounted in the cradle section 44 by means of a pivot pin 60 received in the apertures 62 provided in opposing sidewalls of the cradle section. As should be appreciated, the rocker 58 pivots from side to side about the pivot pin 60 relative to the cradle section 44. A trunnion 64 is provided at the top of a post 66 at each side of the rocker 58. Together the trunnions 64 support the head assembly, generally designated by reference numeral 68, for pivoting movement relative to the rocker 58 in the fore and aft direction: that is, a plane or direction substantially perpendicular to the rocking motion of the rocker about the pivot pin 60.

Figure 2:
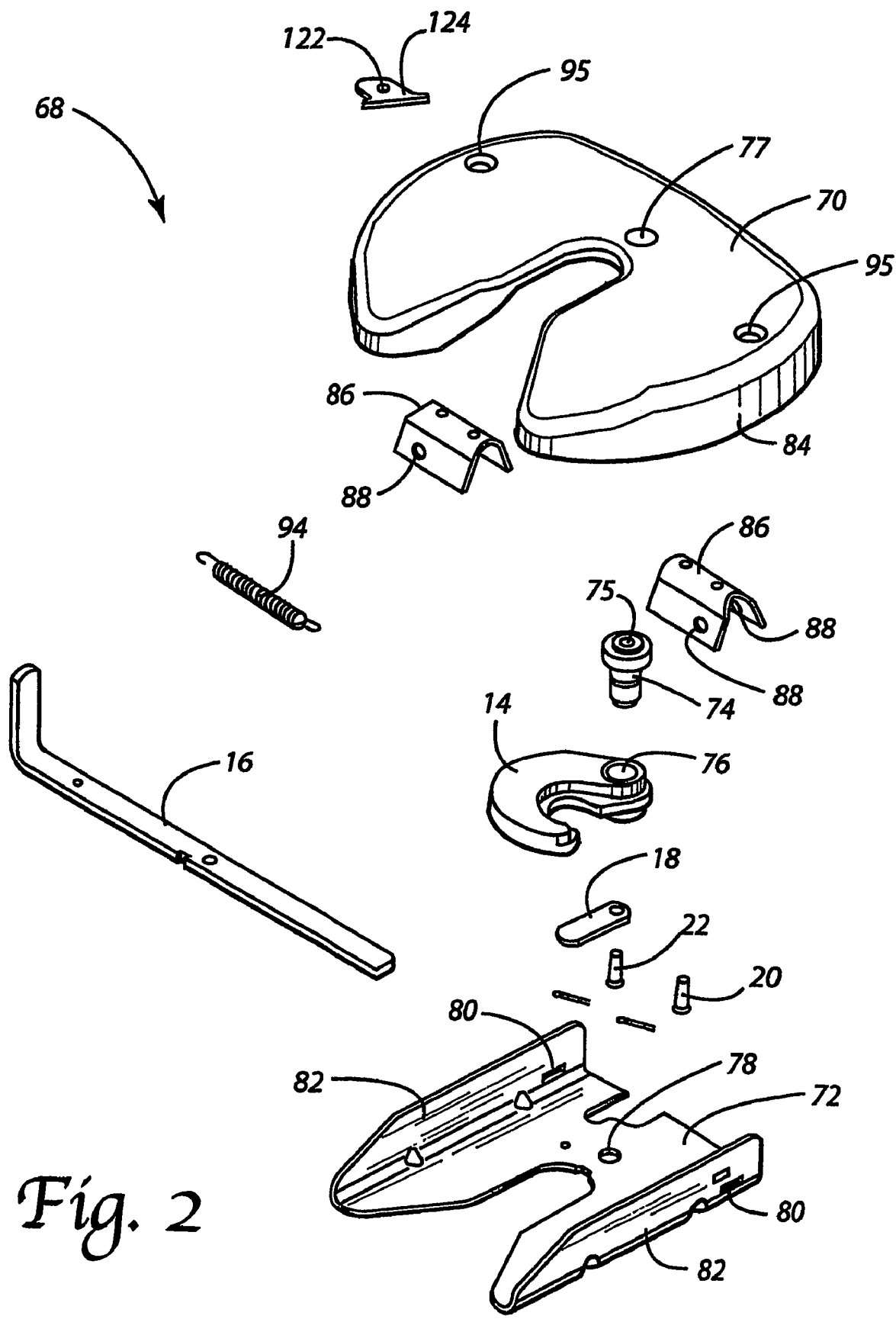
FIG. 2 is a detailed exploded perspective view of the jaw assembly of the present invention.

As best illustrated in FIG. 2, the head assembly 68 includes a skid plate 70 and a mounting platform 72. As illustrated the skid plate 70 is weldless and seamless and, consequently, provides an aesthetically pleasing, smooth, continuous surface. The jaw body 14 is pivotally secured to the mounting platform 72 by means of a pivot pin 74 that is received in an aperture 76 in the jaw body and secured in an aperture 78 in the inner mounting platform. That pivot pin 74 includes a grease zerk 75 and associated grease distribution channels for purposes of lubricating the jaw assembly 12 for smooth operation. The grease zerk 75 is readily accessible through the aperture 77 in the top of the skid plate 70.

The control handle 16 is received for free sliding movement through two slots 80 in opposing walls 82 of the inner mounting platform 72. During construction the jaw assembly 12 is mounted to the inner mounting platform 72 and then the inner mounting platform is welded or otherwise secured to the underside of the skid plate 70 where it is hidden from view by the downwardly depending skirt 84 of the skid plate.

Opposing pivot guides 86 are welded between the opposing walls 82 of the inner mounting platform 72 and the skirt 84 of the skid plate 70. The U-shaped pivot guides 86 include opposing apertures 88. When the head assembly 68 is properly seated on the rocker 58, the pivot guides 86 are received over and rest upon the trunnions 64. Connecting pins 90 are then inserted through the aligned apertures 88 in the pivot guides 86 and the groove 92 in the trunnions 64. Pin clips 94 are then received over the ends of the pins 90 in order to complete the connection. Apertures 95 may be provided in the top of the skid plate 70 to allow an operator to visually confirm positioning of (1) the pivot guides 86 on the trunnions 64, (2) the connecting pins 90 in the apertures 88 and grooves 92 and (3) the clips 94 on the pins. Advantageously, the rocker 58 pivots about the pin 60 to provide the head with limited side to side pivotal movement while the pivot guides 86 pivot about the trunnions 64 and function to provide the head assembly 68 with limited fore and aft pivotal movement. This allows the head assembly 68 to better support a trailer during towing operations including, for example, during slow speed towing over various terrain contours as might be found in a campsite.

The jaw assembly 12 includes a biasing element for biasing the jaw body 14 into a closed or king pin engaging position. That biasing element may take the form of a number of different structural arrangements as demonstrated, for example, in FIGS. 4a, 4b, 5a, 5b, 6a, 6b, 7a and 7b.

In a first embodiment shown in FIGS. 4a and 4b, the biasing element comprises a tension spring 94 having a first end 96 connected to the jaw body 14 and a second end 98 connected to the first pivot pin 20. FIG. 4a shows the jaw assembly 12 of this first embodiment in the closed position. FIG. 4b shows the jaw assembly 12 of the first embodiment in the open position. The jaw assembly 12 is held in the open position against the biasing force of the spring 94 by engaging a notch 100 in the control handle 16 against the sidewall 82 of the inner mounting platform 72.

A second embodiment of the jaw assembly 12 is disclosed in FIGS. 5a and 5b. In this embodiment the tension spring 94 includes a first end 96 connected to the jaw body 14 and a second end 98 connected to the sidewall 82 of the inner mounting platform 72. As illustrated in FIG. 5a, the spring 94 biases the jaw body 14 to the closed position. FIG. 5b illustrates the second embodiment of the jaw assembly 12 in the open position. As in the first embodiment a notch 100 on the control handle 16 is engaged against the sidewall 82 of the inner mounting platform 72 in order to secure the jaw body 14 in the open position against the biasing force of the spring 94.

In the third embodiment shown in FIGS. 6a and 6b, the tension spring 94 has a first end 96 connected to a sidewall 82 of the inner mounting platform 72 and a second end 98 connected to the first pivot 20. As illustrated in FIG. 6a the spring 94 biases the jaw body 14 into the closed position. As illustrated in FIG. 6b, the jaw body 14 is held in the open position against the force of the biasing spring 94 by engaging a notch 100 on the control handle with a sidewall 82 of the inner mounting platform 72.

A fourth embodiment of the jaw assembly 12 is illustrated in FIGS. 7a and 7b. In this embodiment a first spring 94 has a first end 96 connected to the jaw body 14 and a second end 98 connected to the sidewall 82 of the inner mounting platform 72. In addition, the jaw assembly 12 includes a second spring 102 having a first end 104 connected to the opposite sidewall 82 and a second end 106 connected to the first pivot pin 20. In this embodiment, both springs 94, 102 are tension springs producing a force biasing the jaw body 14 into the closed position shown in FIG. 7a. As illustrated in FIG. 7b, the jaw body 14 may be held in the open position by manipulating the control handle 16 and engaging the notch 100 against the sidewall 82 of the inner mounting platform 72.

With the jaw assembly 12 held in the open position by engagement of the notch 100 on the control handle 16 with the sidewall 82 of the inner mounting platform 72 as shown in any of the embodiments illustrated in FIGS. 4a, 5a, 6a and 7a, a trailer may be connected to the trailer hitch assembly 10. Specifically, the vehicle carrying the trailer hitch assembly 10 is slowly backed underneath the trailer with the king pin of the trailer aligned with the opening 110 in the head assembly 68. As the vehicle backs into the trailer, the skid plate on the trailer engages the sloped surface of the skid plate 70 of the trailer hitch assembly 10. This causes the trailer to rise slightly from the ground as the king pin K is directed through the throat of the opening 110 into its proper towing position. With the king pin K properly received in the opening 110, the control handle 16 is manipulated to release the notch 100 from the sidewall 82 of the inner mounting platform 72. The tensioning spring 94 or springs 94, 102 then cause the jaw body 14 to fully close so that the king pin of the trailer is captured in the slot 26 of the jaw body 14. In this position the stepped bearing surface 24 provides an enveloping engagement with the king pin at the first and second steps 28, 30. The control handle 16 may then be locked in position by positioning a pin or the bolt of a padlock (not shown) through an aperture 120 in the control handle 16 that is aligned with a cooperating aperture 122 in a bracket 124 welded to the side of the skid plate 70 (see FIG. 2). This ensures that the locking jaw assembly 12 remains closed, capturing the king pin K for performance of the towing operation.

Once towing is completed, the pin or bolt may be removed from the aperture 120 and the control handle 16 may be manipulated/re-extended from the skid plate 70 so as to again open the jaw body 14 as illustrated in any of the embodiments shown in FIGS. 4b, 5b, 6b and 7b. The vehicle may then be pulled out from underneath the trailer to complete trailer disconnection.

In summary, numerous benefits result from employing the concepts of the present invention. The fifth wheel hitch assembly 10 incorporates a novel locking jaw assembly 12 incorporating a stepped bearing surface 24 that provides engagement with a larger surface area of the king pin K so that towing stresses are more evenly spread over the component parts for reliable and dependable performance over a long service life. The connecting link 18 must move "over center" when the jaw body 14 is moved between the open and closed positions. This provides the operator with a feel through the control handle 16 that inspires confidence during operation. It also ensures that the jaw body 14 moves fully to the open and closed positions. Further, it should be appreciated that the locking jaw assembly 12 incorporates a minimum number of component parts so as to be less expensive to produce.

The foregoing description of the preferred embodiment of the invention has been presented for purposes of illustration and description. It is not intended to be exhaustive or to limit the invention to the precise form disclosed. Obvious modifications or variations are possible in light the above teachings. For example, while the hitch assembly 10 shown in FIG. 1 includes below-the-truck-bed cross members 34 for securing the mounting section of the base assembly 32 to the vehicle, an above-the-bed base rail mounting system could also be utilized.

The embodiment was chosen and described to provide the best illustration of the principals of the invention and its practical application to thereby enable one of ordinary skill in the art to utilize the invention in various embodiments and with various modifications as are suited the particular use contemplated. All such modifications and variations are within the scope of the invention as determined by the appended claims when interpreted in accordance with the breath, to which they are fairly, legally and equitably entitled. The drawings and preferred embodiment do not and are not intended to limit the ordinary meaning of the claims and their fair and broad interpretation in any way.

What is claimed is:

1. A fifth wheel hitch assembly, comprising:
a base assembly;
a head assembly connected to said base assembly, wherein said head assembly includes a skid plate and a mounting platform; and
a jaw assembly connected to said head assembly, said jaw assembly comprising:
a single jaw body for securing a king pin of a trailer, the jaw body having a stepped bearing surface for engaging the king pin;
a control handle;
a connecting link pivotally connected to said control handle by a first pivot pin and to said jaw body by a second pivot pin, wherein said jaw body is pivotally mounted on said mounting platform by means of a third pivot pin; and
a first spring having a first end connected to said jaw body and a second end connected to said head assembly and a second spring having a third end connected to said head assembly and a fourth end connected to said first pivot pin.

2. The hitch assembly of claim 1, further including a grease zerk provided on said third pivot pin.

3. The hitch assembly of claim 1 wherein said head assembly includes a skid plate and a grease zerk access aperture is provided in said skid plate near said grease zerk.

4. The hitch assembly of claim 1, wherein said jaw assembly further includes a first spring having a first end connected to said jaw body and a second end connected to said mounting platform.

5. The hitch assembly of claim 1, wherein said jaw assembly further includes a first spring having a first end connected to said jaw body and a second end connected to said first pivot pin.

6. The hitch assembly of claim 1, wherein said jaw assembly further includes a first spring having a first end connected to said jaw body and a second end connected to said head assembly.

7. The hitch assembly of claim 1, wherein said head assembly includes at least two slots for receiving said control handle, said slots being dimensioned to allow said control handle to slide freely through said slots.

8. The hitch assembly of claim 7, wherein said control handle includes a notch that may be brought into engagement with said head assembly by shifting said control handle transversely in said two slots.

9. The hitch assembly of claim 1, wherein said jaw body is displaceable between an open position and a closed position.

10. The hitch assembly of claim 1, wherein said stepped bearing surface includes a first step having a height of about 0.56 to about 0.81 inches and a tread of about 0.375 to about 0.625 inches and a second step having a height of about 0.43 to about 0.69 inches.

11. The hitch assembly of claim 1, wherein said stepped bearing surface includes a first step having a height of about 0.69 inches and a tread of about 0.5 inches and a second step having a height of about 0.56 inches.

12. A fifth wheel hitch assembly, comprising:
a base assembly;
a head assembly connected to said base assembly, said head assembly having a slot; and
a jaw assembly connected to said head assembly, said jaw assembly comprising:
a single jaw body for securing a king pin of a trailer, the jaw body having a stepped bearing surface for engaging a king pin of a trailer, wherein said jaw body is displaceable between an open position and a closed position;
a control handle having a notch that is engageable with said head assembly by shifting said control handle transversely in said slot;
a connecting link, said connecting link being pivotally connected to said control handle by a first pivot pin and to said jaw body by a second pivot pin;
a first spring having a first end connected to said jaw body; and
a second spring, said second spring being connected between said first pivot pin and said head assembly.

13. The hitch assembly of claim 12, wherein said first spring has a second end and said second end is connected to said first pivot pin.

14. The hitch assembly of claim 12, wherein said first spring has a second end and said second end is connected to said head assembly.

* * * * *